United States Patent
Choi et al.

(10) Patent No.: US 11,155,655 B2
(45) Date of Patent: Oct. 26, 2021

(54) ORGANOMETAL CATALYST HAVING CATIONIC TRANSITION METAL COMPLEX AND BORATE-BASED BULKY ANION, METHOD FOR PREPARING THE SAME, AND METHOD FOR PREPARING OLIGOMER USING THE SAME

(71) Applicant: LG Chem, Ltd., Seoul (KR)

(72) Inventors: Gyeong Shin Choi, Daejeon (KR); Dong Hyun Jo, Daejeon (KR); Hyun Taek Oh, Daejeon (KR); Won Hee Kim, Daejeon (KR); Seung Young Park, Daejeon (KR)

(73) Assignee: LG Chem, Ltd.

( * ) Notice: Subject to any disclaimer, the term of this patent is extended or adjusted under 35 U.S.C. 154(b) by 12 days.

(21) Appl. No.: 16/637,095

(22) PCT Filed: Mar. 21, 2019

(86) PCT No.: PCT/KR2019/003326
§ 371 (c)(1),
(2) Date: Feb. 6, 2020

(87) PCT Pub. No.: WO2019/182386
PCT Pub. Date: Sep. 26, 2019

(65) Prior Publication Data
US 2020/0247924 A1    Aug. 6, 2020

(30) Foreign Application Priority Data
Mar. 21, 2018  (KR) .................. 10-2018-0032600

(51) Int. Cl.
*C08F 110/10*    (2006.01)
*C08F 6/02*    (2006.01)
(Continued)

(52) U.S. Cl.
CPC ......... *C08F 110/10* (2013.01); *B01J 31/1805* (2013.01); *B01J 31/2239* (2013.01);
(Continued)

(58) Field of Classification Search
CPC . C08G 85/00; C08G 65/20; C08F 6/02; C08F 110/10; C08F 4/69; C08F 2410/03;
(Continued)

(56) References Cited

U.S. PATENT DOCUMENTS

2003/0088135 A1  5/2003 Yun et al.
2003/0176606 A1  9/2003 Bohnenpoll et al.
(Continued)

FOREIGN PATENT DOCUMENTS

JP   2003277428 A   10/2003
KR   100486044 B1   4/2005
(Continued)

OTHER PUBLICATIONS

Kom-Bei Shiu et al: "Conditioned P-CH 2 Bond Cleavage of a-DPPM Ligand in a Cationic Diruthenium System", Organometallics, vol. 16, No. 1, Jan. 7, 1997 (Jan. 7, 1997), pp. 114-119.*
(Continued)

*Primary Examiner* — William K Cheung
(74) *Attorney, Agent, or Firm* — Lerner, David, Littenberg, Krumholz & Mentlik, LLP

(57) ABSTRACT

The present invention provides an organometal catalyst having a cationic transition metal complex and a borate-based bulky anion, a method for preparing the same, and a method for preparing an oligomer using the same.

18 Claims, 1 Drawing Sheet

(51) Int. Cl.
| | |
|---|---|
| *C08L 23/22* | (2006.01) |
| *B01J 31/22* | (2006.01) |
| *C08G 65/20* | (2006.01) |
| *B01J 31/18* | (2006.01) |
| *C08G 85/00* | (2006.01) |
| *C08F 4/69* | (2006.01) |

(52) U.S. Cl.
CPC .... *B01J 2231/12* (2013.01); *B01J 2531/0219* (2013.01); *B01J 2531/60* (2013.01); *B01J 2531/64* (2013.01); *B01J 2531/82* (2013.01); *C08F 4/69* (2013.01); *C08F 6/02* (2013.01); *C08F 2410/03* (2013.01); *C08F 2500/02* (2013.01); *C08G 65/20* (2013.01); *C08G 85/00* (2013.01); *C08L 23/22* (2013.01)

(58) Field of Classification Search
CPC ............... C08F 2500/02; C08L 23/22; B01J 2531/0219; B01J 2531/64; B01J 2531/60; B01J 31/2239; B01J 2231/12; B01J 31/1805; B01J 2531/82
USPC .......................................................... 526/134
See application file for complete search history.

(56) References Cited

U.S. PATENT DOCUMENTS

| | | | |
|---|---|---|---|
| 2008/0221285 A1 | 9/2008 | Walter et al. | |
| 2009/0105432 A1 | 4/2009 | Rath et al. | |

FOREIGN PATENT DOCUMENTS

| | | | |
|---|---|---|---|
| KR | 20080034024 A | 4/2008 | |
| KR | 20080044870 A | 5/2008 | |

OTHER PUBLICATIONS

Nippe et al., Oxidation Chemistry of Axially Protected Mo2 and W2 Quadruply Bonded Compounds, Inorganic Chemistry, Nov. 2009, pp. 11889-11895, vol. 48, No. 24.*

Kuhn et al., Solvent stabilized transition metal cations as initiators for cyclopentadiene polymerization, Macromolecular Rapid Communications, 1999, pp. 555-559, vol. 20, No. 10.*

Balch et al., Association of Isocyanide Complexes of Rhodium(I) and Rhodium(III) in Solution, Journal of the American Chemical Society, Apr. 1976, pp. 2354-2356, vol. 98. No. 8, XP055715957.

Bera et al., Syntheses and reactivity studies of solvated dirhenium acetonitrile complexes, Dalton Transactions, Jun. 2006, pp. 4011-4019, No. 33, The Royal Society of Chemistry, XP055715927, ISSN:1477-9226, DOI:10.1039/b601463a.

Chakraborty et al., Ullmann-Type and Related Redox Reactions of Nitrosyl Molybdenum Complexes Bearing a Large-Bite-Angle Diphosphine, European Journal of Inorganic Chemistry, Dec. 2015, pp. 103-110, vol. 2016, No. 1, XP055715949, ISSN:1434-1948, DOI:10.1002jejic.201501062.

Extended European Search Report including Written Opinion for Application No. EP19770678.1, dated Jul. 29, 2020, pp. 1-9.

Nippe et al., Oxidation Chemistry of Axially Protected Mo2 and W2 Quadruply Bonded Compounds, Inorganic Chemistry, Nov. 2009, pp. 11889-11895, vol. 48, No. 24, XP055715963, ISSN:0020-1669, DOI:10.1021/c901965b.

Shiu et al., Conditioned P-CH2 Bond Cleavage of a m-DPPM Ligand in a Cationic Diruthenium System, Organometallics, Jan. 1997, pp. 114-119, vol. 16, No. 1, XP055715962.

Cotton et al., Better Understanding of the Species with the Shortest Re2 6+ Bonds and Related Re2 7+ Species with Tetraguanidinate Paddlewheel Structures, Inorganic Chemistry, Published on Web Jan. 2007, pp. 1718-1726, vol. 46, No. 5.

Cotton et al., Replacement of Acetate Ions in Dimolybdenum Tetraacetate by Acetonitrile Molecules: Crystal Structures of Two Compounds Containing the cis-[Mo2(02CCH3)2(CH3CN)4]2+ Cation, Inorganic Chemistry, 1985, pp. 3965-3968, vol. 24.

Cotton et al., Synthesis and Characterization of Octakis(acetonitrile)dimolybdenum(II) Tetrafluoroborate, Inorganic Chemistry, 1991, pp. 871-873, vol. 30.

Diebl et al., Synthesis and Application of Molybdenum (III) Complexes Bearing Weakly Coordinating Anions as Catalysts of Isobutylene Polymerization, Journal of Polymer Science Part A: Polymer Chemistry, 2010, pp. 3775-3786, vol. 48.

International Search Report for Application No. PCT/KR2019/003326, dated Jun. 24, 2019, pp. 1-3.

Koberl, Dicarboxylate-bridged Mo2 paddle-wheel complexes as building units for supramolecular coordination polymers, Dissertation, Technical University of Munich, 2012, pp. 1-142.

Majumdar et al., Role of Axial Donors in the Ligand Isomerization Processes of Quadruply Bonded Dimolybdenum (II) Compounds, Inorganic Chemistry, Published on Web Feb. 2008, pp. 2212-2222, vol. 47, No. 6.

Vierle et al., Highly Reactive Polyisobutenes Prepared with Manganese(II) Complexes as Initiators, Angewandte Chemie International Edition, 2003, pp. 1307-1310, vol. 42, No. 11.

Zhang, Synthesis and Characterization of Metal-Metal Multiply Bonded Complexes and Catalytic Applications of Solvent Stabilized Transition Metal Complexes for Polymerization of Olefins, Dissertation, Technical University of Munich, 2001, pp. 1-155.

Malachy Mccann, et al., "[Mo2(MeCN)8][BF4]4 and [Mo2(?-O2CCH3)2(MeCN)6][BF4]2 as catalysts for the cationic polymerization of cyclopentadiene and dicyclopentadiene", Journal of Molecular Catalysis A: Chemical, Jun. 1996, pp. 99-111, vol. 109, issue 2, Elsevier.

* cited by examiner

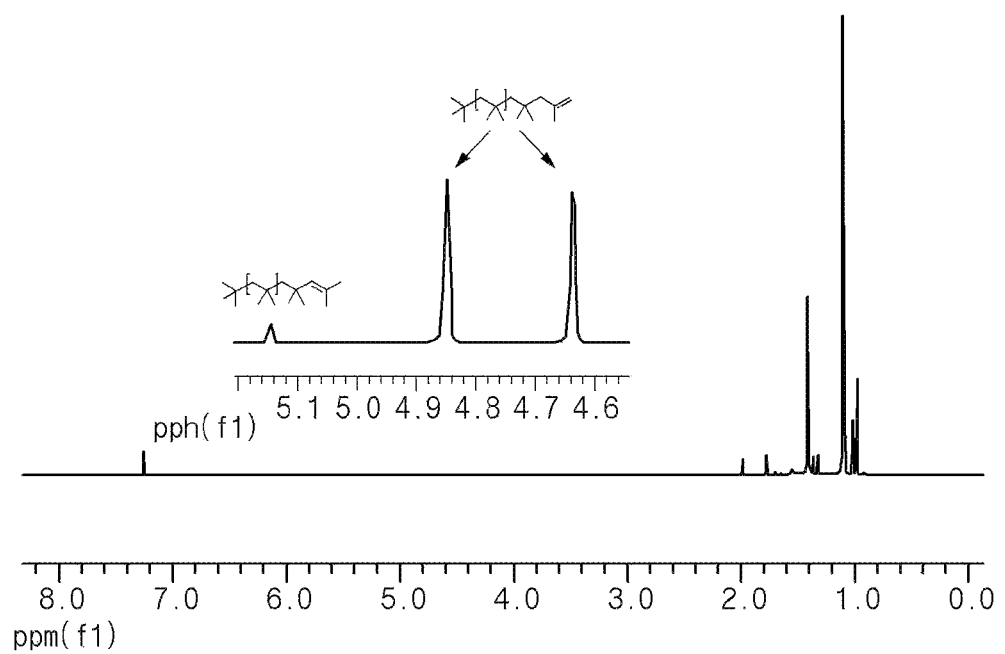

ORGANOMETAL CATALYST HAVING CATIONIC TRANSITION METAL COMPLEX AND BORATE-BASED BULKY ANION, METHOD FOR PREPARING THE SAME, AND METHOD FOR PREPARING OLIGOMER USING THE SAME

CROSS-REFERENCE TO RELATED APPLICATIONS

The present application is a national phase entry under 35 U.S.C. § 371 of International Application No. PCT/KR2019/003326 filed Mar. 21, 2019, which claims priority from Korean Patent Application No. 10-2018-0032600 filed Mar. 21, 2018, all of which are incorporated herein by reference.

TECHNICAL FIELD

The present invention relates to an organometal catalyst having a cationic transition metal complex and a borate-based bulky anion, a method for preparing the same, and a method for preparing an oligomer using the same.

BACKGROUND ART

Generally, in a process for preparing an oligomer by the cationic polymerization of monomers, a propagating polymer chain includes an active part which has a positive charge. For example, the active part may be a carbenium ion (carbon cation) or an oxonium ion.

As a catalyst or an initiator for such cationic polymerization, an aluminum- or boron-based Lewis acid is generally used. Examples of the Lewis acid includes $AlX_3$, $BX_3$ (X=F, Br, Cl, I), etc., and the Lewis acid is a corrosive substance and produces halogen components such as HCl and HF during a quenching process, and this halogen components remain in a product to cause problems of degrading product quality. In addition, a Lewis acid catalyst requires a large amount of catalyst, and in order to remove the catalyst after reaction, a large amount of base (NaOH, KOH, $NH_4OH$, etc.) is used, and accordingly, in order to remove the inorganic salt thus produced, washing with water is required for many times and a large amount of waste water is produced.

Meanwhile, examples of the monomer which is capable of undergoing the cationic polymerization include styrene, isobutene, cyclopentadiene, dicyclopentadiene and the derivatives thereof, and typical examples include polyisobutene obtained by polymerizing isobutene.

In case of the polymerization of polyisobutene, common polybutene and high reactive polybutene (HR-PB) product groups are present. After introducing a functional group using a vinylidene functional group (>80%) at the terminal, the high reactive polybutene is used as a fuel additive or an engine oil additive. In order to polymerize such high reactive polybutene, a boron-based catalyst such as $BF_3$ is conventionally used, but this catalyst is toxic and has a gas type, and is difficult to handle. In addition, in order to increase reactivity and selectivity, a boron-alcohol or boron-ether composite is prepared and used, but there is a problem that the activity is reduced over time.

Accordingly, the development of an organometal catalyst which is capable of solving the above-mentioned problems, as a novel catalyst used for the preparation of a polyolefin such as an oligomer, particularly, polyisobutene is required. The inventors of the present invention found that a high reactive polybutene in which a carbon-carbon double bond is mainly positioned at the terminal of the polybutene, may be stably polymerized by using an organometal catalyst prepared by introducing a coordinating solvent molecule and a bulky anion to a transition metal precursor of a paddle wheel structure, and completed the present invention.

PRIOR ART DOCUMENT

Patent Document

Korean Registration Patent Publication No. 10-0486044 (Apr. 29, 2005)

DISCLOSURE OF THE INVENTION

Technical Problem

An object of the present invention is to provide a novel organometal catalyst which may be used for preparing an oligomer, and a method for preparing the same.

In addition, another object of the present invention is to provide a method for preparing an oligomer using the organometal catalyst.

Technical Solution

An embodiment of the present invention provides an organometal catalyst having a cationic transition metal complex and a borate-based bulky anion and represented by the following Formula 1:

[Formula 1]

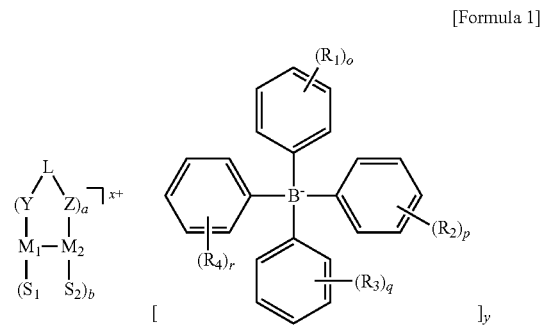

in Formula 1, $M_1$ and $M_2$ are each independently selected from the group consisting of Cr, Mo, W, Re, Ru, Os, Rh, Pd and Pt, where a bond between $M_1$ and $M_2$ is any one among single to quadruple bonds according to an oxidation number of a metal, $S_1$ and $S_2$ are each independently a substituent including any one among oxygen, nitrogen, carbon and halogen atoms having one or more unshared electron pairs, where the unshared electron pair makes a coordination bond with $M_1$ and $M_2$, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ may be combined with each other to form a heteroaryl group of 4 to 20 carbon atoms, $R_1$ to $R_4$ are each independently hydrogen, a halogen group, or a substituted or unsubstituted alkyl group of 1 to 20 carbon atoms, a is an integer of 0 to 3, b is an integer of 1 to 5, a+b is 4 or 5, o, p, q and r are each independently an integer of 1 to 5, and x and y are an integer of 1 to 4 and are the same.

Another embodiment of the present invention provides a method for preparing an organometal catalyst including:

a step of preparing a dispersion including a transition metal precursor represented by Formula 2 below and a coordinating solvent; and a step of reacting an organic borate-based compound including a carbon-based, silyl-based or amine-based cation and a borate-based bulky anion, with the dispersion:

[Formula 2]

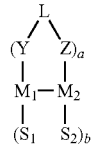

in Formula 2, $M_1$ and $M_2$ are each independently selected from the group consisting of Cr, Mo, W, Re, Ru, Os, Rh, Pd and Pt, where a bond between $M_1$ and $M_2$ is any one among single to quadruple bonds according to an oxidation number of a metal, $S_1$ and $S_2$ are each independently a substituent including any one among oxygen, nitrogen, carbon and halogen atoms having one or more unshared electron pairs, where the unshared electron pair makes a coordination bond with $M_1$ and $M_2$, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ may be combined with each other to form a heteroaryl group of 4 to 20 carbon atoms, a is an integer of 1 to 4, b is an integer of 0 to 3, and a+b is 4 or 5.

Another embodiment of the present invention provides a method for preparing an oligomer using the organometal catalyst.

Advantageous Effects

The novel organometal catalyst of the present invention may be used as a substituent for the conventional aluminum- or boron-based Lewis acid catalyst, and has a relatively small amount used, and thus, is economical and eco-friendly.

In addition, a high reactive polyisobutene in which a carbon-carbon double bond is mainly positioned at the terminal of a polybutene may be prepared with a high conversion ratio.

BRIEF DESCRIPTION OF THE DRAWINGS

The FIGURE shows an NMR spectrum of a polyisobutene polymer obtained according to Example 1 as an embodiment of the present invention.

BEST MODE FOR CARRYING OUT THE INVENTION

Hereinafter, the present invention will be explained in more detail to assist the understanding of the present invention. It will be understood that words or terms used in the specification and claims shall not be interpreted as the meaning defined in commonly used dictionaries. It will be understood that the words or terms should be interpreted as having a meaning that is consistent with their meaning in the context of the relevant art and the technical idea of the invention, based on the principle that an inventor may properly define the meaning of the words or terms to best explain the invention.

The terms used herein are for the purpose of describing particular embodiments only and are not intended to be limiting of the invention. The singular forms are intended to include the plural forms as well, unless the context clearly indicates otherwise.

It will be understood that the terms "comprises", "includes", "has", etc. in this disclosure, specify the presence of stated features, numerals, steps, elements or the combination thereof, but do not preclude the presence or addition of one or more other features, numerals, steps, elements or the combination thereof.

The term "oligomer" used in the present disclosure includes polytetramethylene ether glycol (PTMEG) which is formed by oligomerizing a monomer such as tetrahydrofuran (THF) as well as a low polymer which is formed by oligomerizing olefin.

The organometal catalyst of the present invention is developed as a novel catalyst which solves various problems of the conventional Lewis acid catalyst for the cationic polymerization of olefin. Accordingly, the conventional Lewis acid catalyst is corrosive but the organometal catalyst of the present invention is not corrosive. In addition, the organometal catalyst of the present invention requires a small amount used for obtaining equivalent degree of effects, and the catalyst cost is saved. In addition, in case of the conventional Lewis acid catalyst, a large amount of highly toxic waste water is produced during removing the catalyst through washing with a basic salt such as NaOH after finishing the reaction, but the organometal catalyst of the present invention may remove the catalyst simply through filtering, and the waste water is not produced. In addition, in case of the conventional Lewis acid catalyst, HF or HCl is produced during a quenching process, and halogen remains in a product to induce quality deterioration. However, such problems are dissolved in the organometal catalyst of the present invention and a product with high quality may be clearly produced.

The organometal catalyst of the present invention is characterized in forming a weak coordination bond between a complex and a bulky anion, wherein the complex is formed by substituting at least a portion of a monoanionic ligand with a Lewis base coordinating solvent molecule in a transition metal precursor of a paddle wheel structure including the monoanionic ligand.

In an embodiment, the organometal catalyst having a cationic transition metal complex and a borate-based bulky anion of the present invention is represented by the following Formula 1:

[Formula 1]

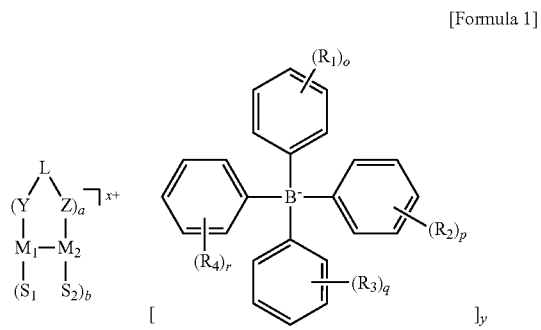

In Formula 1, $M_1$ and $M_2$ are each independently selected from the group consisting of Cr, Mo, W, Re, Ru, Os, Rh, Pd and Pt, where a bond between $M_1$ and $M_2$ is any one among single to quadruple bonds according to an oxidation number of a metal, $S_1$ and $S_2$ are each independently a substituent including any one among oxygen, nitrogen, carbon and halogen atoms having one or more unshared electron pairs, where the unshared electron pair makes a coordination bond with $M_1$ and $M_2$, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ may be combined with each other to form a heteroaryl group of 4 to 20 carbon atoms, $R_1$ to $R_4$ are each independently hydrogen, a halogen group, a substituted or unsubstituted alkyl group of 1 to 20 carbon atoms, a is an integer of 0 to 3, b is an integer of 1 to 5, a+b is 4 or 5, o, p, q and r are each independently an integer of 1 to 5, and x and y are an integer of 1 to 4 and are the same.

In an embodiment, $S_1$ and $S_2$ are each independently a halogen group; or a coordinating solvent molecule including a functional group selected from the group consisting of a cyanide group, an isocyanide group, an ether group, a pyridine group, an amide group, a sulfoxide group and a nitro group;

$R_1$ to $R_4$ are each independently hydrogen, a halogen group, or a substituted or unsubstituted alkyl group of 1 to 20 carbon atoms, preferably, a halogen-substituted alkyl group of 1 to 12 carbon atoms, more preferably, a halogen-substituted alkyl group of 1 to 4 carbon atoms, $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, preferably, hydrogen, a substituted or unsubstituted alkyl group of 1 to 12 carbon atoms, an aryl group of 6 to 12 carbon atoms, or a substituted or unsubstituted amine group, and $R_m$ and $R_n$ may be combined with each other to form a heteroaryl group of 4 to 12 carbon atoms.

In an embodiment, $S_1$ and $S_2$ may be each independently a halogen group; or one or more selected from the group consisting of acetonitrile, propionitrile, 2-methylpropanenitrile, trimethylacetonitrile, benzonitrile, dialkyl ether, for example, diethyl ether or diallyl ether, pyridine, dimethylformamide, dimethyl sulfoxide, nitromethane, nitrobenzene and the derivatives thereof, and may be a coordinating solvent molecule having an unshared electron pair of oxygen, nitrogen or carbon which makes a coordination bond with $M_1$ and $M_2$.

In the organometal catalyst, the borate-based bulky anion may be one or more selected from the group consisting of tetrakis(phenyl)borate, tetrakis(pentafluorophenyl)borate, tetrakis[3,5-bis(trifluoromethyl)phenyl]borate and the derivatives thereof.

In an embodiment, in case where the $M_1$ and $M_2$ are molybdenum and the borate-based bulky anion is tetrakis(pentafluorophenyl)borate, the organometal catalyst of the present invention may be one or more selected from the group consisting of the compounds represented by the following formulae:

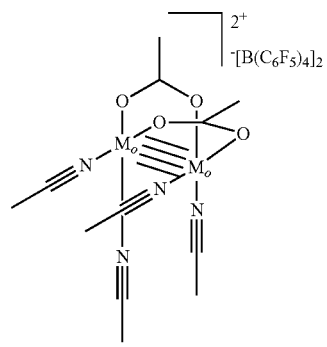

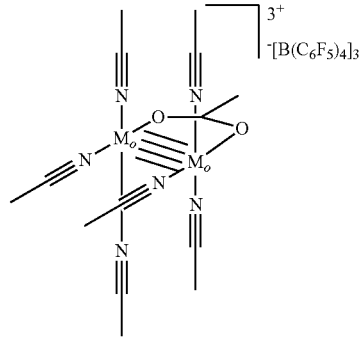

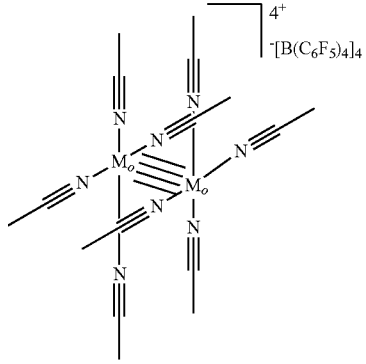

-continued

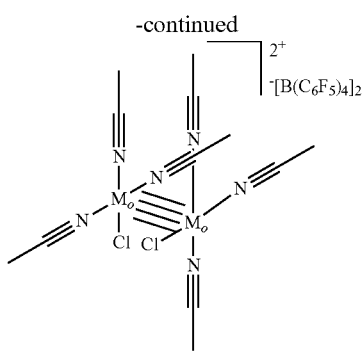

Another embodiment of the present invention provides a method for preparing an organometal catalyst including a step of preparing a dispersion including a transition metal precursor including a monoanionic ligand and a coordinating solvent; and a step of reacting an organic borate-based compound including a carbon-based, silyl-based or amine-based cation and a borate-based bulky anion, with the dispersion.

Hereinafter, the method for preparing an organometal catalyst of the present invention will be explained in particular.

<Method for Preparing Organometal Catalyst>

1) Preparation of Dispersion

The method for preparing an organometal catalyst of the present invention includes a step of preparing a dispersion including a transition metal precursor represented by Formula 2 and a coordinating solvent.

The transition metal precursor includes a monoanionic ligand and is a material having a paddle wheel structure type, and at least a portion of the monoanionic ligand included in the transition metal precursor is substituted with a Lewis base coordinating solvent to form a cationic transition metal complex.

The "paddle wheel" structure may mean a type like a cartwheel in which two transition metal atoms are directly bonded to form a single to quadruple bond and elements are bonded to each transition metal into the same structure. In this case, if the elements connected with each of the transition metals are the same in the paddle wheel structure, the transition metal complex may form a symmetric structure. However, the structure is not limited to the symmetric structure, and the kind of the left and right elements may not be symmetric while maintaining the paddle wheel structure according to the kind of the elements bonded to each transition metal.

The cationic transition metal complex derived from the transition metal precursor having the paddle wheel structure includes two transition metal atoms, and in this case, the oxidation number of each transition metal may be the same or different, or though one transition metal atom has an oxidation number of an unstable state, due to the free movement of electrons with the other transition metal, the cationic transition metal complex may overall maintain a stable state. The oxidation number of each transition metal may be flexibly controlled as long as the cationic transition metal complex exists stably.

The cationic transition metal complex having the paddle wheel structure keeps a stable state and may be used as an organometal catalyst together with a borate-based bulky anion. In addition, the transition metal included in the cationic transition metal complex is present in an unstable state, and if the cationic transition metal complex is injected to the reaction as a catalyst, the reactivity may be further increased. If the cationic complex does not have the paddle wheel structure, one transition metal is included, and in this case, in order to be stably used as the organometal catalyst, the transition metal is required to have an oxidation number of a stable state, and in this case, the stability of the transition metal itself is rather high and the catalyst activity is degraded. Since the cationic transition metal complex of the present invention has the paddle wheel structure, the transition metal included in the complex may have an oxidation number of an unstable state, and electron movement between transition metal-transition metal, transition metal-reactant, and transition metal-monoanionic ligand, may be promoted and the catalyst activity may be increased.

The monoanionic ligand included in the cationic transition metal complex is required to form a coordination bond with two different transition metals so that the complex may maintain the paddle wheel structure. If the coordination bond is too strong, a catalyst active site may not be formed and catalyst reactivity may be degraded, and accordingly, a suitable coordination bond is required to be formed in order that the monoanionic ligand may maintain interaction with the transition metal and the transition metal and the reactant interact to effectively exhibit reactivity as a catalyst. The monoanionic ligand shares electrons with the transition metal or the reactant to be involved with the electron movement between transition metal-transition metal, and transition metal-reactant.

In order to weaken the interaction between the monoanionic ligand and the transition metal, the monoanionic ligand may be substituted with a coordinating solvent which shows relatively weak interaction with the transition metal, and may be used as the catalyst. In case where the solvent is coordinated, the solvent is separated from the transition metal as time goes by, and in this case, aggregation of the transition metal occurs and metal particles are formed, and as a result, problems of loosing catalyst activity may arise. If a catalyst is diluted and used in a low concentration state, the separating tendency of the coordinating solvent increases and the catalyst activity may be further decreased.

Since the cationic transition metal complex of the present invention has a paddle wheel structure, two transition metals are bonded with each other, and defects of forming metal particles due to the aggregation of the transition metal during the separation of the solvent may be prevented.

In the transition metal precursor of the present invention, the monoanionic ligand means a structure in which an anion represents anionic properties among Y-L-Z as shown in the following formula:

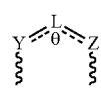

The definition of Y, Z and L is the same as defined above.

Examples of the monoanionic ligand may be one or more selected from the group consisting of an acetic acid anion, a 2,2,2-trifluoroacetic acid anion, a benzoic acid anion, a 2-amino pyridine anion, a 2-amino pyrimidine anion, an N-alkyl amino pyrimidine anion, an N-aryl imino pyrimidine anion, a guanidine anion and the derivatives thereof, particularly, the following monoanionic ligands may be used, without limitation.

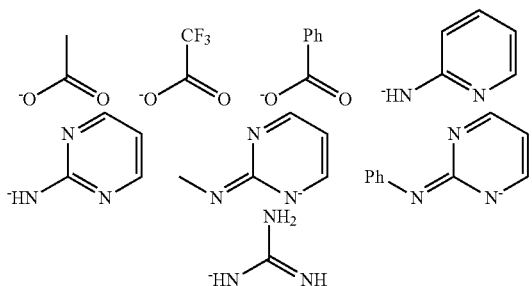

Particularly, the transition metal precursor may be represented by the following Formula 2:

$$[\text{Formula 2}]$$

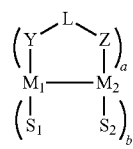

In Formula 2, $M_1$ and $M_2$ are each independently selected from the group consisting of Cr, Mo, W, Re, Ru, Os, Rh, Pd and Pt, where a bond between $M_1$ and $M_2$ is any one among single to quadruple bonds according to an oxidation number of a metal, $S_1$ and $S_2$ are each independently a substituent including any one among oxygen, nitrogen, carbon and halogen atoms having one or more unshared electron pairs, where the unshared electron pair makes a coordination bond with $M_1$ and $M_2$, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ may be combined with each other to form a heteroaryl group of 4 to 20 carbon atoms, a is an integer of 1 to 4, b is an integer of 0 to 3, and a+b is 4 or 5.

In an embodiment, $S_1$ and $S_2$ are each independently a halogen group; or a coordinating solvent molecule including a functional group selected from the group consisting of a cyanide group, an isocyanide group, an ether group, a pyridine group, an amide group, a sulfoxide group and a nitro group; $R_1$ to $R_4$ are each independently hydrogen, a halogen group, or a halogen-substituted alkyl group of 1 to 12 carbon atoms, $R_n$ is hydrogen, a substituted or unsubstituted alkyl group of 1 to 12 carbon atoms, an aryl group of 6 to 12 carbon atoms, or a substituted or unsubstituted amine group, and $R_m$ and $R_n$ may be combined with each other to form a heteroaryl group of 4 to 12 carbon atoms.

In addition, the transition metal precursor used in the reaction may have an anhydrous metal compound or a hydrated metal compound type, without limitation.

In an embodiment, the transition metal precursor may be represented by the following Formula 2a or Formula 2b:

$$[\text{Formula 2a}]$$

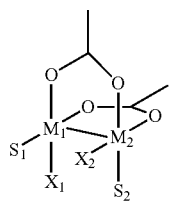

in Formula 2a, $M_1$ and $M_2$ are the same as in Formula 2, $$[\text{Formula 2b}]$$

In Formula 2b, $M_1$ and $M_2$ are the same as in Formula 2, $S_1$ and $S_2$ are each independently a coordinating solvent molecule including any one among oxygen, nitrogen, and carbon atoms having one or more unshared electron pairs, and $X_1$ and $X_2$ are each independently selected from the group consisting of F, Cl, Br and I.

In addition, in the step of preparing a dispersion, the dispersion is characterized in including a coordinating solvent. The coordinating solvent may be any solvents as long as it makes a coordination bond with a central metal, without specific limitation, and may be a nitrile-based solvent, for example, an alkyl cyanide or an aryl cyanide, an ether-based solvent, for example, a dialkyl ether, a pyridine-based solvent, an amide-based solvent, a sulfoxide-based solvent, or a nitro-based solvent.

For example, the coordinating solvent may include one or more selected from the group consisting of acetonitrile, propionitrile, 2-methylpropanenitrile, trimethylacetonitrile, benzonitrile, diethyl ether, diallyl ether, pyridine, dimethylformamide, dimethyl sulfoxide, nitromethane, nitrobenzene and the derivatives thereof.

In the step of preparing a dispersion of the present invention, an excessive amount of the coordinating solvent may be used with respect to the transition metal precursor. Preferably, the total amount of the coordinating solvent which reacts with the transition metal with respect to the transition metal precursor is controlled to a molar ratio of at least 1:4, at least 1:6, at least 1:8, at least 1:10, at least 1:12, at least 1:16, or at least 1:18. Most preferably, an amount is in a range satisfying the molar ratio of at least 1:10.

In addition, the dispersion may further include a non-coordinating solvent, and may be any solvents which may dissolve materials such as remaining metal precursor and organic borate which are not used in the reaction, and not making a coordination bond with the transition metal. Examples of the non-coordinating solvent may include one or more selected from the group consisting of benzene, alkyl benzene, for example, toluene, xylene, ethylbenzene, chlorobenzene, bromobenzene, chloroform and dichloromethane.

In such case where the non-coordinating solvent is used as the solvent of the dispersion, the coordinating solvent which may react with the transition metal precursor and be bonded as the ligand of the transition metal may preferably be injected in a suitable amount of the molar ratio of at least 1:4, at least 1:6, or at least 1:10 with respect to the transition metal precursor.

Accordingly, the method of the present invention may further include a step of adding a coordinating solvent before or after the step of reacting the organic borate-based compound with the dispersion.

2) Reaction of Organic Borate-Based Compound and Dispersion

The method for preparing the organometal catalyst of the present invention includes a step of reacting an organic borate-based compound containing carbon-based, silyl-based, or amine-based cation and a borate-based bulky anion, with the dispersion.

The organic borate-based compound may be represented by the following Formula 3:

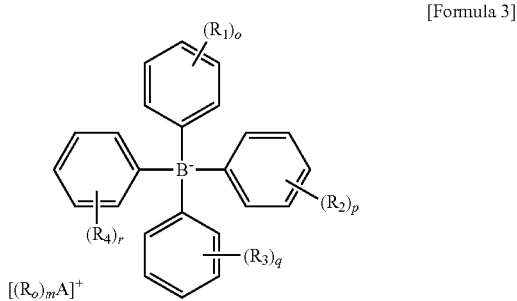

[Formula 3]

In Formula 3,

A is C, Si or N; $R_0$ is each independently hydrogen, an alkyl group of 1 to 20 carbon atoms, an alkoxy group of 1 to 20 carbon atoms, an aryl group of 6 to 20 carbon atoms, or an aryloxy group of 6 to 20 carbon atoms, preferably, hydrogen, an alkyl group of 1 to 12 carbon atoms, an alkoxy group of 1 to 12 carbon atoms, an aryl group of 6 to 12 carbon atoms, or an aryloxy group of 6 to 12 carbon atoms, more preferably, hydrogen, an alkyl group of 1 to 6 carbon atoms, or an alkoxy group of 1 to 6 carbon atoms; m is 3 in case where A is C or Si, and 4 in case where A is N; $R_1$ to $R_4$ are each independently hydrogen, a halogen group, or a substituted or unsubstituted alkyl group of 1 to 20 carbon atoms, preferably, a halogen-substituted alkyl group of 1 to 12 carbon atoms, more preferably, a halogen-substituted alkyl group of 1 to 4 carbon atoms; and o, p, q and r are each independently an integer of 1 to 5.

The borate-based bulky anion may be one or more selected from the group consisting of tetrakis(phenyl)borate, tetrakis(pentafluorophenyl)borate, tetrakis[3,5-bis(trifluoromethyl)phenyl]borate and the derivatives thereof.

In the reaction step of the present invention, the molar ratio of the transition metal precursor and the organic borate-based compound may be 1:1 to 1:8, for example, 1:2, 1:3 or 1:4.

In addition, the reaction step may be performed by stirring the reactants at room temperature for 2 to 5 hours.

The method for preparing the organometal catalyst of the present invention may further include a step of dissolving the organic borate-base compound in a coordinating solvent or non-coordinating solvent prior to reacting with the dispersion. It doesn't matter if the amount of the organic borate-based compound is small, but if a large amount of the organic borate-based compound is prepared and the reaction is performed without dissolving thereof in a solvent, side reactions may occur due to exotherm and yield may be reduced.

In this case, the amount of the coordinating solvent or the non-coordinating solvent is not limited. However, in the reaction step, the total amount of the coordinating solvent may preferably be controlled with respect to the transition metal precursor in a molar ratio of at least 1:4, at least 1:6, at least 1:8, at least 1:10, at least 1:12, at least 1:16, or at least 1:18.

For example, the molar ratio of the organic borate-based compound and the coordinating solvent or non-coordinating solvent may be 1:2 to 1:5, or 1:7 to 1:10.

For example, the method of the present invention may further include a step of adding the organic borate-based compound to the coordinating solvent after the step of reacting with the dispersion.

The method for preparing the organometal catalyst of the present invention may further include a step of washing or distilling the catalyst obtained in the reaction step with an organic solvent. In an embodiment, $(R_O)_3AOCOR$ or $(R_O)_3ANO_3$ (A=C or Si, $R_O$=each independently hydrogen, an alkyl group, an alkoxy group, an aryl group or an aryloxy group, and R=hydrogen, alkyl, aryl or allyl) produced in the reaction step may be easily removed by simply washing with an organic solvent or distilling. In case of using an amine-based borate, HOCOR or $HNO_3$ produced together with aniline may also be easily removed through washing or distilling.

The organic solvent may include one or more selected from the group consisting of a linear or cyclic alkyl solvent, for example, pentane, cyclopentane, hexane, cyclohexane, heptane, octane, and an ether solvent, for example, diethyl ether or petroleum ether.

<Method for Preparing Oligomer>

The present invention provides as another embodiment, a method for preparing an oligomer, including a step of performing cationic polymerization of a monomer using the organometal catalyst.

The monomer may be one or more selected from the group consisting of styrene, isobutene, cyclopentadiene, dicyclopentadiene, tetrahydrofuran and the derivatives thereof.

In addition, in the step of the cationic polymerization of the monomer, the amount of the monomer based on the weight of the total reactant may be 1 to 50 wt %, preferably, 5 to 25 wt %. In addition, the amount of the catalyst based on the total reactant may be 0.005 to 5 wt %, preferably, 0.01 to 1 wt % or 0.01 to 0.05 wt %.

In addition, the exo-amount of the polyolefin prepared by the preparation method may be 45 to 99%, preferably, 75 to 99%. The exo-amount represents a case where a carbon-carbon double bond is positioned at the terminal of the polyolefin, and if the exo-amount increases, it means that high reactive polyolefin, for example, polybutene (HR-PB) is produced well.

In addition, the number average molecular weight of the oligomer may be 500 to 4500, preferably, 1000 to 3000.

In addition, the polydispersity index (PDI) of the oligomer may be 1.5 to 3, preferably, 1.8 to 2.5.

<Removal of Catalyst After Polymerizing Oligomer>

The preparation method of the oligomer of the present invention may further perform a step of removing the catalyst after polymerizing the oligomer. The organometal catalyst of the present invention may be easily removed through a step of simple filtering, and in this regard, has a lot of advantages when compared with the conventional Lewis acid catalyst.

In an embodiment, after polymerizing the oligomer, the organic solvent may be controlled to 40 wt % or less, 20 wt % or less, or 5 wt % or less by removing the organic solvent.

Then, in case of a polymer with flowability, a step of filtering an insoluble material using a glass filter having 80 mesh or more, 100 mesh or more, or 200 mesh or more is performed. Alternatively, the catalyst may be removed by passing the polymer with flowability through a silica or celite filter.

Meanwhile, in case of a polymer with low flowability, the polymer may be imparted with flowability using an organic solvent such as a linear or cyclic alkyl solvent, for example, pentane, cyclopentane, hexane, cyclohexane, heptane, octane, or an ether solvent, for example, diethyl ether or petroleum ether, and then, the step of filtering through the glass filter may be performed.

In addition, the method of the present invention may further include a step of removing the organometal catalyst by washing the oligomer thus prepared using one or more organic solvents selected from the group consisting of pentane, cyclopentane, hexane, cyclohexane, heptane, octane, diethyl ether and petroleum ether.

Hereinafter, embodiments of the present invention will be described in detail so as to assist the understanding of the present invention. The invention may, however, be changed and modified in many different forms within the scope of the present invention and the range of technical spirit by a person skilled in the art, and such change and modification should be included in attached claims.

EXAMPLES

Preparation Example 1
<Preparation of Organometal Catalyst>

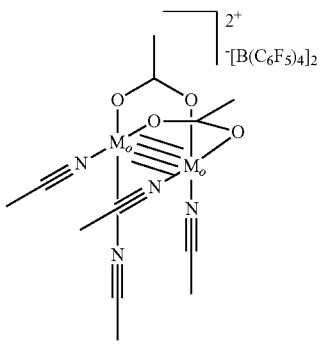

Under an argon atmosphere in a glove box, 100 mg of molybdenum(II) acetate ($Mo_2C_8H_{16}O_8$) was put in 2 ml of acetonitrile and stirred into a dispersion type. 2 equivalents of $[Et_3Si][B(C_6F_5)_4]$ (368 mg) (purchased from Asahi Glass Co.) of the metal precursor thus obtained was dissolved in 2 ml of acetonitrile and added to the stirring molybdenum (II) acetate. Stirring was performed further at room temperature for 5 hours, and all organic solvents were removed in vacuum. Remaining solid was washed with hexane three times and dried in vacuum to prepare a $[Mo_2(OAc)_2(MeCN)_4][B(C_6F_5)_4]_2(MeCN)_2$ catalyst (quantitative yield).

Selected IR (KBr): vCN=2317, 2285 cm$^{-1}$; elemental analysis calcd (%) for $C_{64}H_{26}B_2F_{40}Mo_2N_6O_4$: C, 40.11, H, 1.37, N, 4.39. Found: C, 39.91; H, 1.29; N, 4.31.

Preparation Example 2

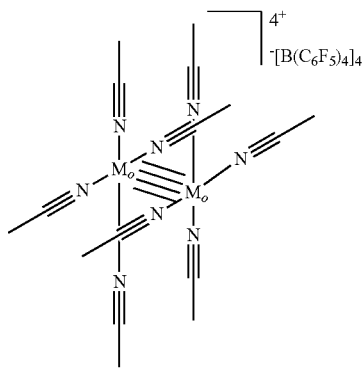

In the preparation of the organometal catalyst in Preparation Example 1, the same method was performed except for using 4 equivalents $[Et_3Si][B(C_6F_5)_4]$ (736 mg) of the metal precursor to prepare a $[Mo_2(MeCN)_8][B(C_6F_5)_4]_4(MeCN)_2$ catalyst.

Selected IR (KBr): vCN=2317, 2287 cm$^{-1}$; elemental analysis calcd (%) for $C_{116}H_{30}B_4F_{80}Mo_2N_{10}$: C, 41.98, H, 0.91, N, 4.22. Found: C, 41.67; H, 1.18; N, 4.48.

Comparative Preparation Example 1

Under an argon atmosphere in a glove box, 100 mg of molybdenum(II) acetate ($Mo_2C_8H_{16}O_8$) was put in a mixture solvent of 2 ml of dichloromethane and 1 ml of acetonitrile and then stirred. 3 ml of dichloromethane in which 1.0 M of $(C_2H_5)_3OBF_4$ was dissolved was slowly added to the stirring molybdenum acetate solution. After stirring at room temperature for 3 hours, all organic solvents were removed under reduced pressure conditions. The red product thus obtained was washed with 3 ml of hexane three times. The remaining organic solvent was removed again under reduced pressure conditions, and a catalyst having a $BF_4$ anion instead of the bulky anion of Preparation Example 1 was prepared.

Selected IR (KBr): vCN=2293, 2256 cm$^{-1}$; elemental analysis calcd (%) for $C_{16}H_{24}B_2F_8Mo_2N_6O_4$: C, 26.33, H, 3.31, N, 11.51. Found: C, 26.23; H, 3.18; N, 11.31.

Experimental Example 1
<Polymerization of Polyisobutene>

To a well-dried andrew glass flask in a convection oven, a magnetic bar was put and vacuum was applied and maintained for about 1 hour. An ice-bath was manufactured using acetone-dry ice and the andrew glass flask was cooled, and then, an isobutene line was connected and an appropriate amount was condensed. The amount of isobutene put in the andrew glass flask was checked, and dry dichloromethane was put to adjust the concentration of isobutene to a desired degree. The temperature of the andrew glass flask thus prepared was elevated to 30° C. A catalyst to be used was prepared in a glove box, dissolved in a small amount of dichloromethane, and injected using a syringe. After 2 hours from the injection, the andrew glass flask was opened, remaining isobutene was removed, and the reaction was quenched using methanol. The remaining solvent was removed using a rotary evaporator, and remaining polymer was completely dried in vacuum until no weight change was observed.

By using each catalyst of Preparation Examples 1 and 2, and Comparative Preparation Example 1, each polyisobutene of Examples 1 to 8 and Comparative Example 1 was prepared. In addition, boron trifluoride diethyl etherate ($BF_3DEE$) of Aldrich Co. was purchased and used as Comparative Example 2. The polymerization results are shown in Table 1 below.

TABLE 1

| | Catalyst | IB Conc. (wt %, solvent DCM) | Catalyst injection (wt %) | Conversion ratio (%) | Exo-amount (%) | hour (h) | Mn | PDI |
|---|---|---|---|---|---|---|---|---|
| Example 1 | Preparation Example 1 | 5 | 0.01 | 95 | 92 | 2 | 1530 | 2.5 |
| Example 2 | Preparation Example 1 | 8 | 0.025 | 99 | 91 | 2 | 1220 | 2.5 |
| Example 3 | Preparation Example 1 | 8 | 0.01 | 82 | 92 | 2 | 1430 | 2.2 |
| Example 4 | Preparation Example 1 | 20 | 0.005 | 99 | 92 | 2 | 1560 | 2.4 |
| Example 5 | Preparation Example 1 | 20 | 0.01 | 99 | 89 | 2 | 2330 | 2.1 |
| Example 6 | Preparation Example 2 | 10 | 0.01 | 99 | 90 | 2 | 1220 | 2.1 |
| Example 7 | Preparation Example 2 | 20 | 0.01 | 99 | 89 | 2 | 2090 | 2.1 |
| Example 8 | Preparation Example 2 | 20 | 0.005 | 99 | 90 | 2 | 2140 | 2.2 |
| Comparative Example 1 | Comparative Preparation Example 1 | 20 | 0.01 | 99 | 69 | 15 | 2090 | 3.2 |
| Comparative Example 2 | $BF_3DEE$ purchased and used | 20 | 0.01 | 32 | 21 | 2 | 4450 | 2.9 |

In the results, when preparing a polybutene according to an embodiment of the present invention, the conversion ratio was generally excellent, and the preparation of polyisobutene having a number average molecular weight of 1220 to 2330 was confirmed.

It was confirmed that the polyisobutene polymerized according to an embodiment of the present invention had an exo-amount of 89% or more, and the formation of HRPB was confirmed. On the contrary, the exo-amount of the polyisobutene of Comparative Example 1 which used a catalyst having a $BF_4$ anion instead of a bulky anion or Comparative Example 2 which purchased and used $BF_3DEE$ as a catalyst was markedly small.

The FIGURE shows an NMR spectrum of a polybutene produced by Example 1, and the chief production of a compound in which a carbon-carbon double bond is positioned at the terminal of the polybutene may be confirmed again.

In addition, according to the Examples, it may be confirmed that the polyisobutene having a high exo-amount with a better conversion ratio was produced though using the same or smaller catalyst amount when compared with Comparative Example 2.

Experimental Example 2

<Removal of Catalyst from Polymerized Polyisobutene>

After polymerizing the polyisobutene according to Example 5, the organic solvent was removed to control the amount of the organic solvent to 5 wt % or less of the polymer. Then, a step of removing the catalyst by dissolving the polyisobutene in a hexane solvent and washing, and a step of removing the catalyst by filtering using a glass filter with 100 mesh were performed, respectively.

After that, with respect to the case of removing the catalyst through washing, the case of removing the catalyst through filtering and the case of unremoving the catalyst, ICP and IC analysis were performed, respectively, according to the methods below, and the results are listed in Table 2 below.

1) Mo analysis: ICP-OES (Optima 7300DV)
2) F, Cl analysis: Combustion IC (ICS-5000/AQF-2100H)

TABLE 2

| | Cation component [mg/kg] | Anion component [mg/kg] | |
|---|---|---|---|
| Specimen name | Central metal (Mo) | F | Cl |
| Catalyst removal through PB washing | <1 | <10 | <10 |
| Catalyst removal through PB filtering | <1 | <10 | <10 |
| Unremoving PB catalyst | 2 | 40 | <10 |

The invention claimed is:

1. An organometal catalyst having a cationic transition metal complex and a borate-based bulky anion, the organometal catalyst being represented by the following Formula 1:

[Formula 1]

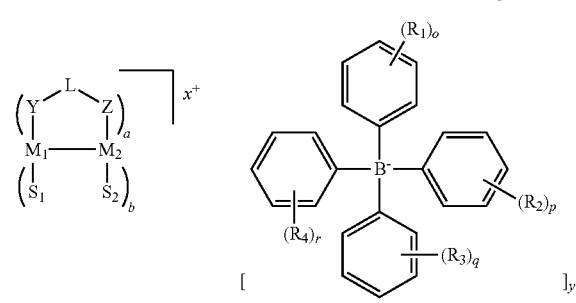

in Formula 1, $M_1$ and $M_2$ are each independently a metal selected from the group consisting of Cr, Mo, W, Re, Ru, Os, Rh, Pd and Pt, where a bond between $M_1$ and $M_2$ is any one among single to quadruple bonds according to an oxidation number of the metal, $S_1$ and $S_2$ are each independently a halogen group; or one or more selected from the group consisting of acetonitrile, propionitrile, 2-methylpropanenitrile, trimethylacetonitrile, benzonitrile, diethyl ether, diallyl ether, pyridine, dimethylformamide, dimethyl sulfoxide, nitromethane, nitrobenzene and the derivatives thereof, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ are optionally combined with each other to form a heteroaryl group of 4 to 20 carbon atoms, $R_1$ to $R_4$ are each independently hydrogen, a halogen group, or a substituted or unsubstituted alkyl group of 1 to 20 carbon atoms, a is an integer of 0 to 3, b is an integer of 1 to 5, a+b is 4 or 5, o, p, q and r are each independently an integer of 1 to 5, and x and y are an integer of 1 to 4 and are the same.

2. The organometal catalyst according to claim 1, wherein $S_1$ and $S_2$ are each independently a halogen group; or a coordinating solvent molecule comprising a functional group selected from the group consisting of a cyanide group, an isocyanide group, an ether group, a pyridine group, an amide group, a sulfoxide group and a nitro group;

$R_1$ to $R_4$ are each independently hydrogen, a halogen group, or a halogen-substituted alkyl group of 1 to 12 carbon atoms, $R_n$ is hydrogen, a substituted or unsubstituted alkyl group of 1 to 12 carbon atoms, an aryl group of 6 to 12 carbon atoms, or a substituted or unsubstituted amine group, and $R_m$ and $R_n$ are optionally combined with each other to form a heteroaryl group of 4 to 12 carbon atoms.

3. The organometal catalyst according to claim 1, wherein the borate-based bulky anion is one or more selected from the group consisting of tetrakis(phenyl)borate, tetrakis(pentafluorophenyl)borate, tetrakis[3,5-bis(trifluoromethyl)phenyl]borate and the derivatives thereof.

4. The organometal catalyst according to claim 1, wherein the organometal catalyst is used for cationic polymerization of one or more kinds of monomers selected from the group consisting of styrene, isobutene, cyclopentadiene, dicyclopentadiene, tetrahydrofuran and the derivatives thereof.

5. A method for preparing an organometal catalyst, the method comprising:

a step of preparing a dispersion comprising a transition metal precursor represented by Formula 2 below and a coordinating solvent; and a step of reacting an organic borate-based compound comprising a carbon-based, silyl-based or amine-based cation and a borate-based bulky anion, with the dispersion:

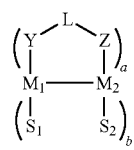

[Formula 2]

in Formula 2, $M_1$ and $M_2$ are each independently a metal selected from the group consisting of Cr, Mo, W, Re, Ru, Os, Rh, Pd and Pt, where a bond between $M_1$ and $M_2$ is any one among single to quadruple bonds according to an oxidation number of the metal, $S_1$ and $S_2$ are each independently a substituent including any one among oxygen, nitrogen, carbon and halogen atoms having one or more unshared electron pairs, where the unshared electron pair makes a coordination bond with $M_1$ and $M_2$, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ are optionally combined with each other to form a heteroaryl group of 4 to 20 carbon atoms, and a is an integer of 1 to 4, b is an integer of 0 to 3, and a+b is 4 or 5, wherein the coordinating solvent is a nitrile-based solvent, an ether-based solvent, a pyridine-based solvent, an amide-based solvent, a sulfoxide-based solvent, or a nitro-based solvent.

6. The method according to claim 5, wherein $S_1$ and $S_2$ are each independently a halogen group; or a coordinating solvent molecule comprising a functional group selected from the group consisting of a cyanide group, an isocyanide group, an ether group, a pyridine group, an amide group, a sulfoxide group and a nitro group;

$R_1$ to $R_4$ are each independently hydrogen, a halogen group, or a halogen-substituted alkyl group of 1 to 12 carbon atoms, $R_n$ is hydrogen, a substituted or unsubstituted alkyl group of 1 to 12 carbon atoms, an aryl group of 6 to 12 carbon atoms, or a substituted or unsubstituted amine group, and $R_m$ and $R_n$ are optionally combined with each other to form a heteroaryl group of 4 to 12 carbon atoms.

7. The method according to claim 5, wherein the transition metal precursor is represented by the following Formula 2a or Formula 2b:

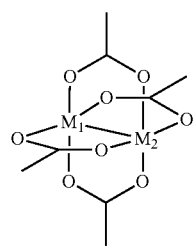

[Formula 2a]

in Formula 2a, $M_1$ and $M_2$ are each independently selected from the group consisting of Cr, Mo, W, Re, Ru, Os, Rh, Pd and Pt;

[Formula 2b]

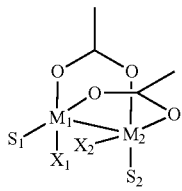

in Formula 2b, $M_1$ and $M_2$ are each independently selected from the group consisting of Cr, Mo, W, Re, Ru, Os, Rh, Pd and Pt, $S_1$ and $S_2$ are each independently a coordinating solvent molecule comprising any one among oxygen, nitrogen, and carbon atoms having one or more unshared electron pairs, and $X_1$ and $X_2$ are each independently selected from the group consisting of F, Cl, Br and I.

8. The method according to claim 5, wherein the organic borate-based compound is represented by the following Formula 3:

[Formula 3]

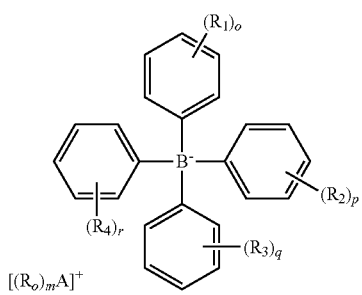

in Formula 3,

A is C, Si or N, $R_0$ is each independently hydrogen, an alkyl group of 1 to 20 carbon atoms, an alkoxy group of 1 to 20 carbon atoms, an aryl group of 6 to 20 carbon atoms, or an aryloxy group of 6 to 20 carbon atoms, m is 3 when A is C or Si, or 4 when A is N, $R_1$ to $R_4$ are each independently hydrogen, a halogen group, or a substituted or unsubstituted alkyl group of 1 to 20 carbon atoms, and o, p, q and r are each independently an integer of 1 to 5.

9. The method according to claim 8, wherein $R_0$ is each independently hydrogen, an alkyl group of 1 to 12 carbon atoms, an alkoxy group of 1 to 12 carbon atoms, an aryl group of 6 to 12 carbon atoms, or an aryloxy group of 6 to 12 carbon atoms, and $R_1$ to $R_4$ are each independently hydrogen, a halogen group, or a halogen-substituted alkyl group of 1 to 12 carbon atoms.

10. The method according to claim 5, further comprising a step of dissolving the organic borate-based compound in a coordinating solvent or a non-coordinating solvent prior to reacting with the dispersion.

11. A method for preparing an oligomer, the method comprising a step of performing cationic polymerization of a monomer using the organometal catalyst according to claim 1.

12. The method for preparing an oligomer according to claim 11, wherein the monomer is one or more selected from the group consisting of styrene, isobutene, cyclopentadiene, dicyclopentadiene, tetrahydrofuran and the derivatives thereof.

13. The organometal catalyst according to claim 1, which is selected from the group consisting of the compounds represented by the following formulae:

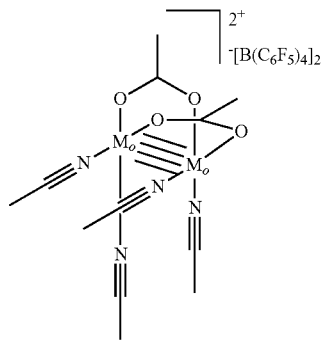

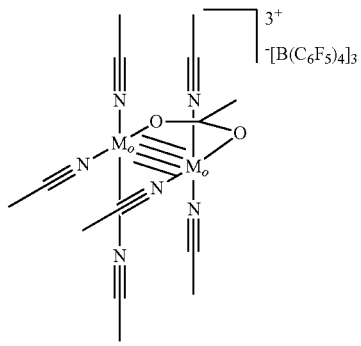

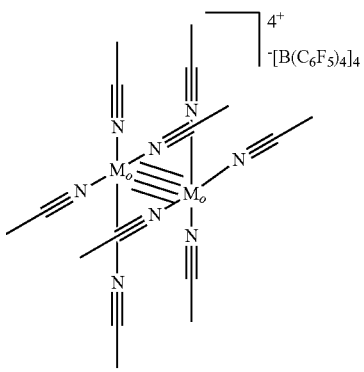

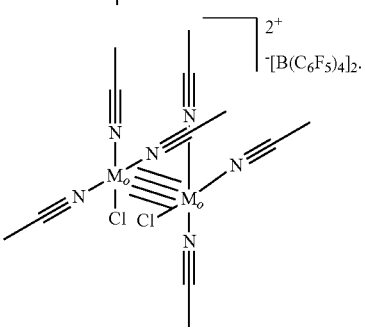

14. The organometal catalyst according to claim 1, wherein Y-L-Z is represented by one of the following monoanionic ligands:

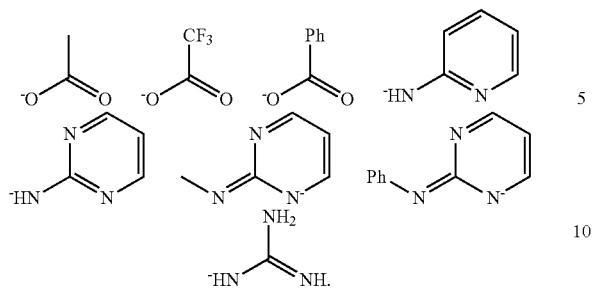

15. The method according to claim 5, wherein the coordinating solvent comprises one or more selected from the group consisting of acetonitrile, propionitrile, 2-methylpropanenitrile, trimethylacetonitrile, benzonitrile, diethyl ether, diallyl ether, pyridine, dimethylformamide, dimethyl sulfoxide, nitromethane, nitrobenzene and the derivatives thereof.

16. The method according to claim 5, wherein the borate-based bulky anion is one or more selected from the group consisting of tetrakis(phenyl)borate, tetrakis(pentafluorophenyl)borate, tetrakis[3,5-bis(trifluoromethyl)phenyl]borate and the derivatives thereof.

17. The method according to claim 5, wherein the transition metal precursor and the organic borate-based compound has a molar ratio of 1:1 to 1:8.

18. The method according to claim 5, further comprising a step of washing or distilling the catalyst obtained in the reaction step with an organic solvent.

* * * * *